July 23, 1963
R. B. McCASKILL
3,098,607
APPARATUS FOR USE IN SETTING VOTING
MACHINE FOR VOTER CLASSIFICATION
Filed June 28, 1961
5 Sheets-Sheet 1
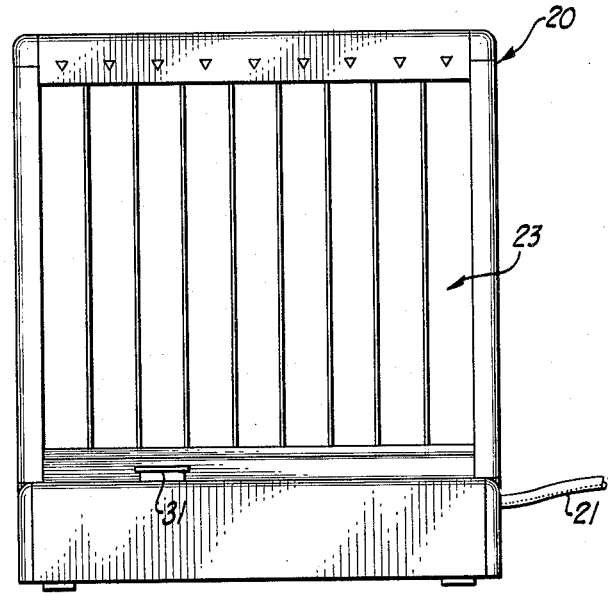
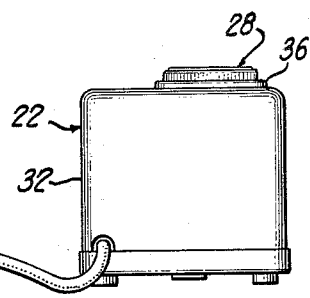
*Fig. 1*
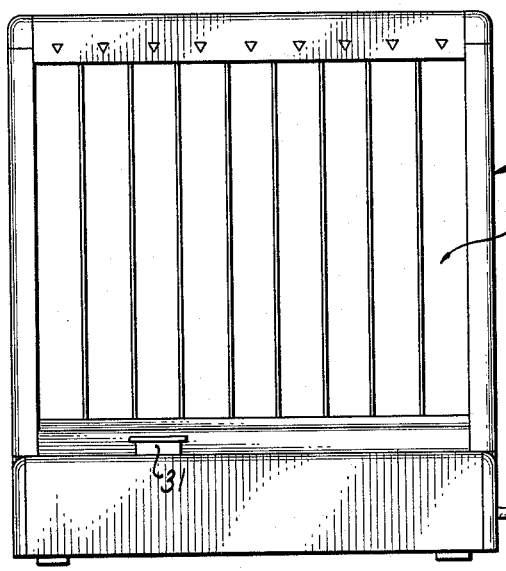
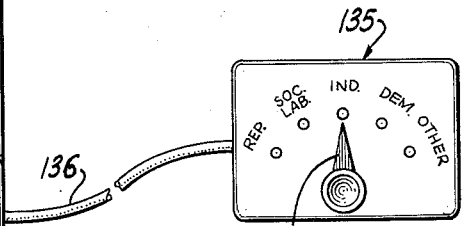
*Fig. 2*
INVENTOR.
ROBERT B. McCASKILL
BY
Mason, Kolehmainen, Rathburn and Wyss
ATTORNEYS July 23, 1963
R. B. McCASKILL
3,098,607
APPARATUS FOR USE IN SETTING VOTING
MACHINE FOR VOTER CLASSIFICATION
Filed June 28, 1961
5 Sheets-Sheet 2
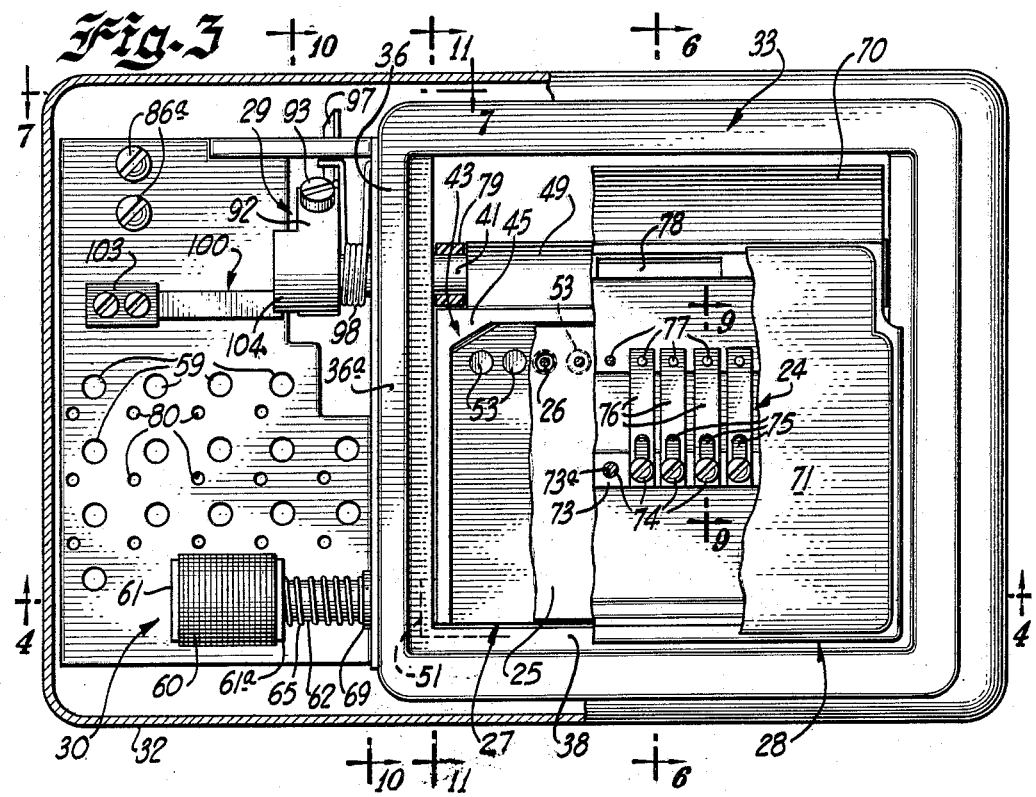
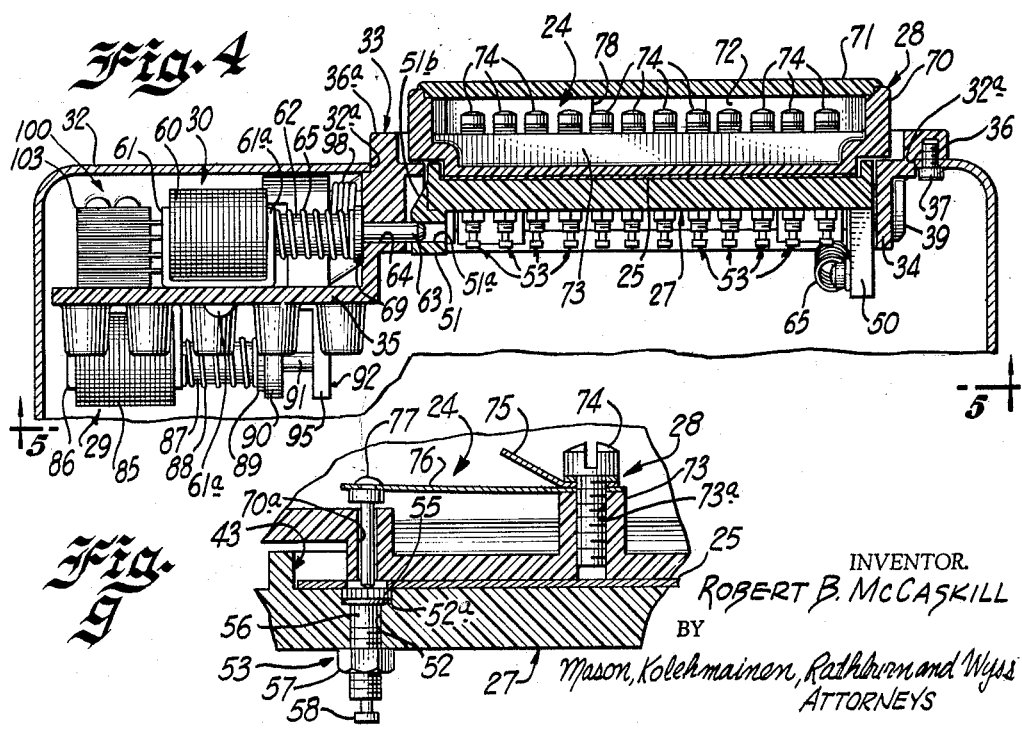
INVENTOR.
ROBERT B. McCASKILL
BY
Mason, Kolehmainen, Rathburn and Wyss
ATTORNEYS

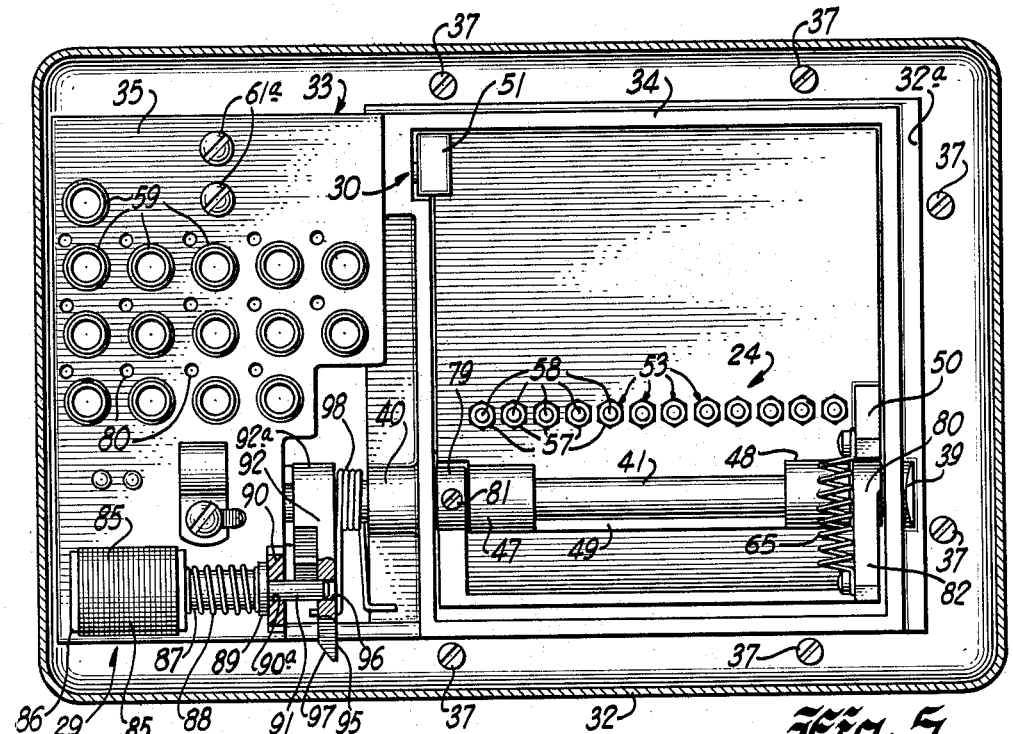
Fig. 5
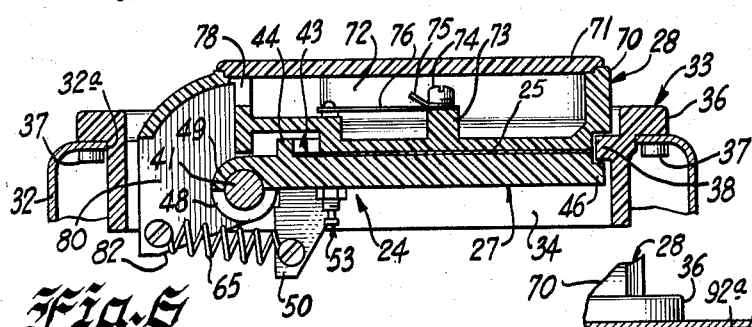
Fig. 6
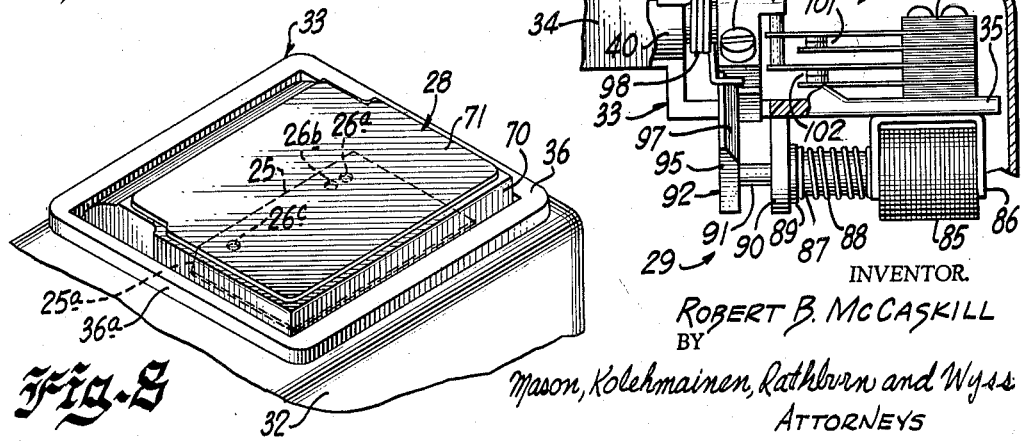
Fig. 7
Fig. 8
INVENTOR.
ROBERT B. McCASKILL
BY
Mason, Kolehmainen, Rathburn and Wyss
ATTORNEYS

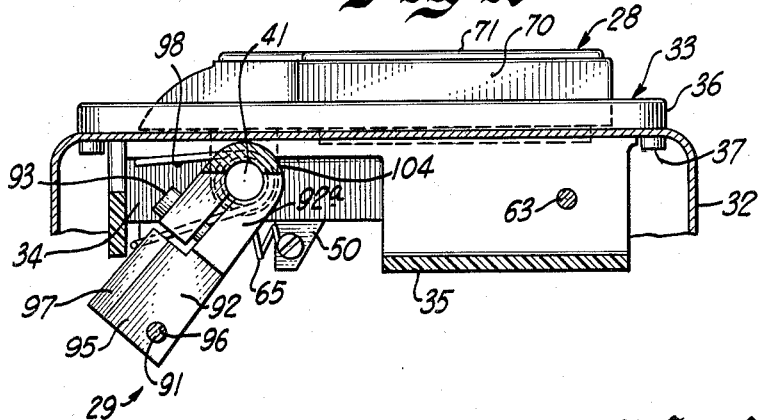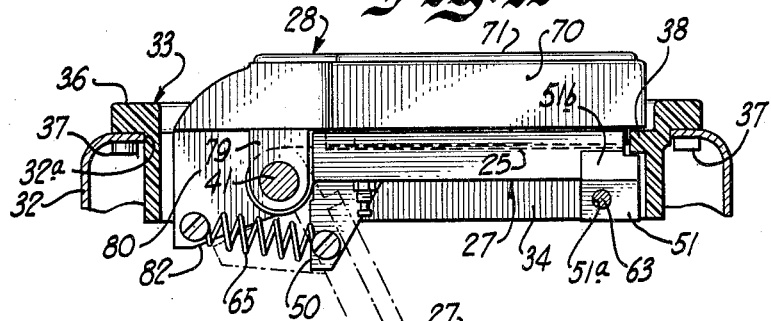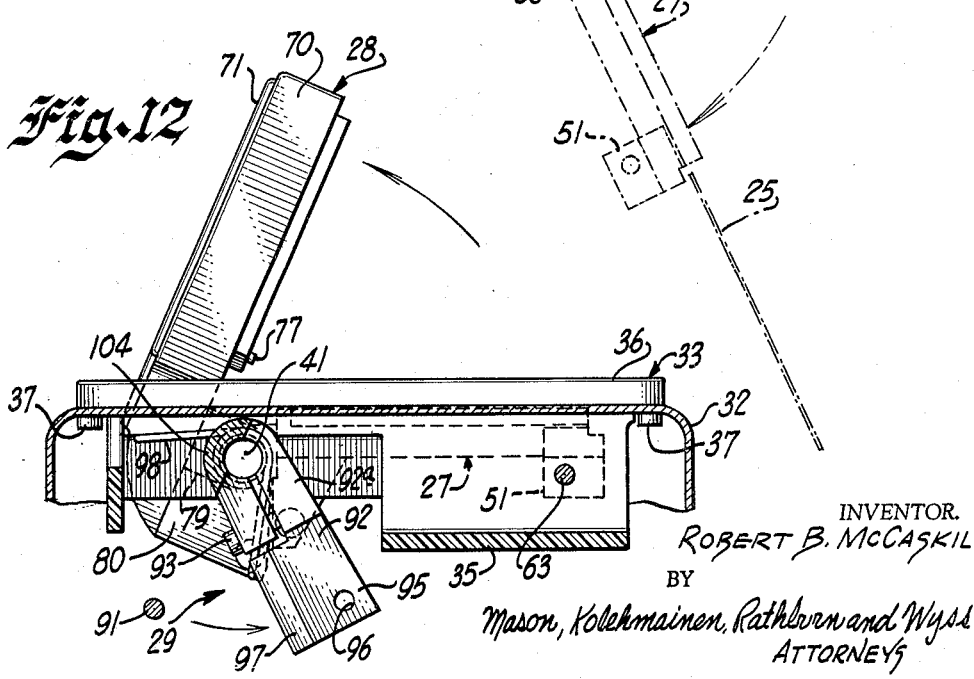

July 23, 1963

R. B. McCASKILL 3,098,607

APPARATUS FOR USE IN SETTING VOTING
MACHINE FOR VOTER CLASSIFICATION

Filed June 28, 1961

INVENTOR.
ROBERT B. McCASKILL
BY
Mason, Kolehmainen, Rathburn and Wyss
ATTORNEYS Уnited States Patent Office 3,098,607
Patented July 23, 1963

3,098,607
APPARATUS FOR USE IN SETTING VOTING
MACHINE FOR VOTER CLASSIFICATION
Robert B. McCaskill, Tulsa, Okla., assignor to Seismograph Service Corporation, Tulsa, Okla., a corporation of Delaware
Filed June 28, 1961, Ser. No. 120,214
18 Claims. (Cl. 235—54)

The present invention relates generally to voting machines and is more particularly concerned with new and improved apparatus for use in voting machines of the type disclosed and claimed in copending United States patent applications Serial Nos. 74,825, 74,887, 74,888, all filed on December 9, 1960 and all assigned to the same assignee as the present invention, for rendering the machine effective in accordance with the classification of the voter.

When a voting machine is to be used in special elections such as a primary election, the arrangement must be such that the voter may cast his votes only for candidates of his own party. This means either that separate machines must be provided at each voting station for the different political parties participating in a primary election or that the machine must be so programmed or set up by an election official prior to the use of the machine by each voter that the voter cannot participate in the selection of candidates of parties other than his own. A similar problem arises in some elections where a voter may not be qualified to vote on certain issues as, for example, in the case of issues where only real property owners are eligible to participate. The use of separate voting machines in such special cases or in primary elections is, of course, expensive, and, particularly in regions where relatively small numbers of voters use a voting station, is not a very practical solution to the problem. The programming of the machine for each voter is a laborious and time consuming operation and, hence, considerably impedes the progress of the election. In pending U.S. application Serial No. 74,887 referred to above, a voting machine is disclosed including mechanism for automatically programming the machine according to voter classification prior to use by each voter in response to information obtained from the ballot card inserted into the machine by the voter. The present invention has for a principal object the provision of new and improved means for rendering a voting machine effective only for issues on which the voter is qualified to vote.

The invention has for another object the provision of a voter classification unit remote from the voting machine and accessible only to the precinct officials to avoid tampering or improper voting by the voter.

A further object of the invention is to provide a remote voter classification unit electrically connected by a cable to the voting machine to render the latter machine effective to register votes only for issues upon which the voter is qualified to vote.

Another object of the invention is to provide a remote automatic voter classification unit of the type described above for sensing the voter's classification from information pre-recorded on a card supplied to the voter.

It is a further object of the invention to provide a voting machine of the type described above wherein each voter is supplied with a voting card, the machine including means for sensing the validity of the card and for dropping it into a collecting chamber after the vote has been cast, thereby to provide a count of the number of voters using the machine.

The invention has for another object the provision of a voting machine including means for preventing removal of the voter's card after it has been properly positioned within the machine.

The invention has for a further object the provision of a remote automatic voter classification unit for receiving the voter's card, sensing the pre-recorded information thereon, dropping the card into a collecting chamber after the vote is cast and for then automatically returning to its original condition to receive the card of the next succeeding voter.

The foregoing and other objects are realized, in accordance with the present invention, by providing a voting machine of the type disclosed in simultaneously filed copending application Serial No. 120,281 of Edward J. Crossland et al., assigned to the same assignee as the present invention, cooperating with a remotely positioned voter classification unit electrically connected to the voting machine via a cable and plug. The remote unit is located outside of the voting booth and is accessible to the precinct officials but not to the voter and, as a result, the voter cannot tamper with the remote unit or use it in a fradulent manner for improper voting. In one form of the invention, the remote voter classification unit takes the form of a manually operated electrical switch for completing different electrical circuits energizing groups of solenoids associated with counter actuators carried by a scanning rail as is described in the copending Crossland et al. application referred to above. The switch is manually set by the precinct official to a position corresponding to the voter's classification and the voting machine itself has been pre-set or programmed to register the voter's selections only on issues corresponding to that classification.

In another form of the invention, the remote voter classification unit senses a card supplied to each voter and pre-punched in accordance with the voter's classification and the sensed information is used to automatically render effective only those columns of the voting machine containing issues on which the voter is qualified to vote. The automatic unit is provided with a card holder for receiving the voter's card and a cover which is manually closed by the voter after the card has been inserted. The card is also pre-punched with validating information coded for the particular election in order to inhibit the fraudulent use of improper cards not furnished by the precinct officials. The cover and the card holder carry sensers for detecting the pre-punched information on the card and if the card is valid and has been properly inserted into the machine the card cover will be mechanically latched in the closed position to prevent removal of the card. If the cover is closed without a card or if an invalid card is used the voting operation cannot continue. However, if a valid card is properly inserted, the sensed classification information renders effective all columns containing issues for which the voter is qualified by energizing solenoids associated with these columns in the manner described in detail in the above-identified Hull et al. application. As is described in the latter application, a circuit is completed to move the scanning rail in the key restoring direction to return all keys to the neutral position and to raise the curtain from the front panel of the voting machine. The voter then proceeds to make his selections by moving the voting keys and when this operation has been completed he operates a Vote switch to close a circuit to the drive motor for the scanning rail so that the latter begins its vote sensing sweep. When the Vote switch is operated the card holder is pivoted away from the cover to drop the voter's card into a collecting chamber. When the scanning rail completes its sensing sweep a circuit is completed to restore both the card holder and the cover to their original positions as a unit with the cover open in condition for receiving the card of the next succeeding voter.

The invention both as to its organization and manner of operation will best be understood by reference to the following detailed description taken in conjunction with the accompanying drawings wherein:

FIG. 1 is a front elevational view showing a voting machine electrically connected via a cable to a remote automatic voter classification unit characterized by the features of the invention;

FIG. 2 is a view similar to FIG. 1 but shows the voting machine electrically connected to a remote manually operated voter classification unit in accordance with another embodiment of the invention;

FIG. 3 is an enlarged top plan view of the automatic voter classifiction unit illustrated in FIG. 1 with certain parts broken away to show various details of construction;

FIG. 4 is a fragmentary, sectional view taken along a line substantially corresponding to the line 4—4 of FIG. 3 assuming, of course, that the latter shows the entire construction of the remote unit;

FIG. 5 is a sectional view taken along a line substantially corresponding to the line 5—5 in FIG. 4 assuming again that the latter shows the entire construction of the remote automatic voter classification unit;

FIG. 6 is a fragmentary, sectional view taken along a line substantially corresponding to the line 6—6 in FIG. 3 again assuming that the latter shows the entire construction;

FIG. 7 is a fragmentary, sectional view taken along a line substantially corresponding to the line 7—7 in FIG. 3 assuming again that the latter shows the entire construction of the remote automatic voter classification unit;

FIG. 8 is a fragmentary, perspective view showing the remote voter classification unit with its cover closed to hold a voter classification card in position while the voter is operating the voting machine preparatory to casting his vote;

FIG. 9 is an enlarged, fragmentary, sectional view taken along a line substantially corresponding to the line 9—9 in FIG. 3 and shows particularly the construction of one pair of sensing means for sensing information pre-punched on the voter's card;

FIG. 10 is a fragmentary, sectional view taken along a line substantially corresponding to the line 10—10 in FIG. 3 assuming that the latter illustrates the entire construction and shows both the card holder and the cover in closed position;

FIG. 11 is a fragmentary, sectional view taken along a line substantially corresponding to the line 11—11 in FIG. 3 and shows in broken lines the card holder in its card dropping position for dropping the card after the voter has cast his vote;

FIG. 12 is a view similar to FIG. 10 but shows the cover in its raised or open position and the card holder in its card receiving position ready to receive a card from the voter at the beginning of the voting operation; and FIG. 13 is a simplified schematic diagram of an electrical circuit for controlling the operation of the voting machine in cooperation with the remote automatic voter classification unit.

Referring now the the drawings and first to the embodiment of the invention shown in FIG. 1, a voting machine generally indicated by the reference numeral 20 is there shown electrically connected by means of a cable 21 to a remote automatic voter classification unit 22 characterized by the features of the present invention. The voting machine 20, as was indicated above, is preferably of the type described and claimed in the above identified copending application of Edward J. Crossland et al., and, as is described in the latter application, the voting machine includes a front panel indicated generally by the reference numeral 23 containing a number of voting keys or selectors (not shown) mounted for sliding movement vertically of the panel to permit the voter to make his selections. The machine 20 is further provided with a scanning rail (not shown) which is moved in one direction along the rear of the panel 23 as viewed in FIG. 1 to sense the voter's selections and to actuate counters corresponding to the positions of the candidates or issues chosen by the voter. In the arrangement illustrated in FIG. 1, the voter is supplied with an identification card indicated by the reference numeral 25 in FIGS. 3, 4, 6, 8, 9 and 13 and having pre-recorded information thereon which may take the form of punched holes as shown in FIGS. 3, 8, 9 and 13. As will be described more fully hereinafter, certain of these holes, for example, the hole 26c shown in FIGS. 8 and 13, identify the classification of the voter while other holes, for example, the holes 26a and 26b, provide a coded validation for the card to inhibit fraudulent voting by the use of cards other than those supplied by the precinct officials. The card has one corner cut off as indicated at 25a in FIG. 8 so that this card may be placed in a card holder 27 in only one position. The card holder 27 is normally held in a card receiving position by means of a latching mechanism 30 shown in FIGS. 3, 4 and 5 which mechanism is released after the vote is cast to pivot the holder to a card dropping position shown in broken lines in FIG. 11. At the start of the operation, the cover 28 is in the raised or open position shown in FIG. 12 and, hence, the voter's card is inserted into the card holder and a cover 28 is then manually pivoted to its closed position shown in FIG. 10. Since the unit 22 is remote from the voting booth containing the machine 20, the voter is unable to tamper with the remote classification unit or to use fraudulent practices for improper voting. The holder 27 and cover 28 are provided with sensing means generally indicated by the reference numeral 24 in FIGS. 3, 4, 5, 6 and 9 for sensing the pre-recorded information on the card 25 for the purpose of (a) determining whether a card has been inserted, (b) making certain that the card is valid and (c) determining the classification of the voter and automatically setting up the voting machine 20 so that the voter may make selections only upon issues for which he is qualified to vote. If the ballot card has been properly inserted into the holder and if the pre-punched information thereon indicates that it is a valid card, the cover 28 is latched in the closed position by means of a latching mechanism indicated generally by the reference numeral 29 and best shown in FIGS. 3 and 7. When the voter first approaches the voting machine 20, the scanning rail is at the bottom of the voting machine housing and a curtain (not shown) covers the front panel 23 so that the selections made by the previous voter are not visible. If the card 25 is valid and if it has been properly inserted, a circuit is completed to raise the scanning rail in order to restore all of the voting keys to their neutral positions and to raise the curtain in order to uncover the front panel 23. After the scanning rail and the curtain have been raised, the voter proceeds to make his selections on the front panel 23 by manipulating the sliding voting keys or selectors and after he is satisfied with the selections made, he depresses a "Vote" switch 31 on the voting machine 20 which completes a circuit to the drive mechanism for the scanning rail to drive the latter from the top of the voting machine 20 to the bottom and, at the same time, to lower the curtain over the front panel 23. During the movement of the scanning rail, in its vote sensing sweep, the counters are actuated to record the voter's selections. When the "Vote" switch is depressed, the card holder 27 is pivoted away from the card cover 28 to the broken line position shown in FIG. 11 whereupon the voter's identification card is dropped into a collecting chamber within the housing 32 of the remote voter classification unit 22. The number of cards deposited into the collecting chamber, of course, provides a measure of the number of voters using the machine 20 and, hence, this information can be used to determine the number of votes cast during the election. When the scanning rail has completed its vote sensing sweep, a limit switch is actuated to terminate the drive to the scanning rail and, at the same time, to pivot the card holder 27 and the cover 28 as a unit back to the original position shown in FIG. 12 with the cover raised or open to expose the card holder for receipt of the identification card from the next succeeding voter to use the machine.

Turning now to the details of construction of the components mentioned above, it will be observed that the housing 32 takes the form of a generally rectangularly shaped box made up of sheet metal members secured together in any suitable manner. The top of the box is provided with a rectangularly shaped opening 32a (FIGS. 4 and 6) for accommodating a rigid base or support 33 formed of any suitable material such as a heavy plastic. As is best shown in FIGS. 4, 5 and 6 of the drawings, the support 33 includes a generally rectangularly shaped frame 34 having an integrally formed, outwardly extending horizontal platform 35 thereon for supporting the components forming the latching means 29 and 30 and also forming a terminal board for the electrical connections for the terminals of the conductors of the cable 21 and for the leads to the sensing means 24. The frame 34 has an upwardly extending rim 36 which overlies the top of the housing 32 along three sides of the frame and which merely extends upwardly beyond the top of the housing in the housing along the fourth side 36a. The support 33 may be secured to the housing 32 in any suitable manner as, for example, by means of screws 37 (FIGS. 4, 5, 6, 10, 11 and 12). The frame 34 as is best shown in FIGS. 6 and 11 is provided with a ledge 38 extending inwardly from the frame to provide a stop for limiting the movement of the card holder 27 so that the latter cannot be pivoted outwardly of the housing beyond the plane of the top. As is best shown in FIG. 5 of the drawings, the frame 34 is also provided with a pair of spaced apart bosses 39 and 40 having horizontally aligned openings therein for accommodating the opposed ends of a shaft 41 for supporting the card holder 27 and the cover 28. The shaft 41 extends beyond the boss 40 to connect with the latching means 29 in a manner described more fully below.

Turning next to the construction of the card holder 27 and referring particularly to FIGS. 3, 4 and 6 of the drawings, it will be observed that this holder comprises a generally rectangularly shaped member forming a card receiving tray indicated generally by the reference character 43 in FIGS. 3 and 6. The tray is formed by a vertically and upwardly extending rim 44 extending around three sides thereof with the fourth side shown at the right side as viewed in FIG. 6, being left open. The rim 44 is of substantially uniform thickness throughout except for one corner 45 (FIG. 3) which is thickened to provide an index cooperating with the cut corner 25a of the voter card 25 to prevent improper insertion of the card. A lip 46 extends outwardly from the tray to the right as viewed in FIG. 6 to underlie the ledge 38 when the card holder is in its card receiving position. The other end of the tray is provided with a rearwardly curving portion forming a pair of annular collars 47 and 48 (FIG. 5) encircling the shaft 41 to mount the card holder 27 for pivotal movement about this shaft. A downwardly extending depending stop 50 is formed integrally with the card holder 27 to cooperate with the cover 28 to limit the pivotal movement of the card holder when the latter is pivoted to its card dropping position illustrated in broken lines in FIG. 11. A downwardly depending foot formed integrally with the card holder at the end thereof adjacent the open end of the tray is provided with an aperture 51a (FIG. 4) cooperating with the latch means 30 to hold the card holder in the card receiving position until the "Vote" switch 31 is operated. The foot 51 is provided with an inclined pin guide face 51b at its top for the purpose of guiding the latching means 30 into the opening 51a to lock the cover in the card receiving position. As is best shown in FIG. 9 of the drawings, the tray is provided with a plurality of aligned apertures 52 each of which is counter-sunk adjacent the top surface of the tray to provide an annular recess for accommodating the head 55 of an electrically conducting sensing pin 53 having a shank 56 extending through the associated opening 52, this pin forming part of the sensing means 24 referred to above. The head 55 of each pin is of such thickness that its upper face lies substantially flush with the top surface of the tray bottom. The shank 56 is externally threaded at its lower end to accommodate a nut 57 seating against the bottom of the card holder 27 to hold the sensing pin in position. An electrical connection is made to each sensing pin 53 through a terminal screw 58 threaded into the lower end of each shank 56 and the leads from these pins are respectively connected to a set of terminals on the platform 35, for example, to a set of terminals 59.

As was previously indicated, the card holder 27 is adapted to be pivoted from its card receiving position shown in solid lines in FIG. 11 in a clockwise direction to the position shown in broken lines so that the card 25 may be dropped through the open end of the tray 43 and into the interior of the housing 32. However, until the "Vote" switch 31 of the voting machine is operated by the voter, the card holder 27 is latched in its closed or card receiving position, a function which, as was indicated above, is performed by the latch means 30. To this end, the latter latch means includes a solenoid 60 (FIGS. 3 and 4) mounted upon a U-shaped support bracket 61 secured upon the top of the platform 35 as, for example, by means of screws 61a. The armature 62 of the solenoid 60 carries at its outer end a pin 63 which extends through an opening 64 in the frame 34 of the base 33 and which protrudes beyond the frame and into the aperture 51a in the foot 51 of the card holder. The pin 63 is normally biased to the position shown in FIG. 4 by means of a coil spring encircling the armature 62 and interposed between the bracket 62 and an annular collar 69 carried by the armature. The latter collar seats against the frame 34 to limit the rightward movement of the solenoid armature 62 and viewed in FIGS. 3 and 4. When the solenoid 60 is energized, the armature 62 is, of course, retracted or moved to the left as viewed in FIG. 4 to withdraw the end of the pin 63 from the aperture 51a, thus releasing the card holder 27 for pivotal movement to the card dropping position. To effect the latter movement a tension spring 65 has one end secured to the cover 28 and has its other end secured to the stop 50 on the card holder (FIGS. 4, 5 and 6) to normally urge the card holder 27 towards the card dropping position. Thus, when the latch 30 is released the spring 65 pivots the card holder in a clockwise direction as viewed in FIG. 11 until the stop 50 engages and seats against the cover 28 to limit the clockwise movement.

Considering next the construction of the cover 28 and referring particularly to FIGS. 3, 4 and 6, it should be observed that this cover is formed in two pieces, both of which are of relatively rigid material such as hard plastic. These two pieces consist of a first member 70 and a lid or top piece 71 cooperating with the first member to form a chamber 72 containing a set of cover sensing pins 77 cooperating with the pins 53 to form the sensing means 24. The lid 71 is seated within a peripheral recess formed in the member 70 around the chamber 72. The member 70 includes a main body portion shaped to form a rectangularly shaped recess having an elongated rib 73 extending thereacross and the rib is provided with a plurality of spaced apart tapped bores 73a (FIG. 9) each receiving a terminal screw 74. Each terminal screw serves to hold both an electrical terminal 75 and a leaf spring 76 on the rib 73. Each leaf spring extends outwardly from the rib and carries on its free end one of the pins 77 with each pin extending downwardly through an opening 70a in the member 70 in vertical alignment with one of the pins 53 in the card holder. One pin 77 is thus provided for each of the pins 53 and each such pair of pins cooperate to determine whether the card 25 contains a prepunched hole in the region between the pair of pins. If such a hole is provided, the leaf spring 76 is effective to bias the pin 77 into engagement with its mating lower pin 53 thus completing an electrical circuit between this pair of pins as is shown in FIG. 9. In all areas where the card 25 is not punched, the card serves as an insulator to prevent contact between the mating pairs of pins. An electrical conductor is connected to each of the terminals 75 and all of these conductors extend through the chamber 72 and through an opening 78 (FIG. 3) formed in the member 70. The other ends of the conductors are respectively connected to electrical terminals 80 carried on the platform 35. The member 70 is also provided with a pair of integral bosses 79 and 80 having horizontally aligned apertures therein for receiving the shaft 41. A set screw (FIG. 5) 81 extends through the boss 79 to engage the shaft 41 in order to secure the cover 28 to the shaft and to prevent rotation therebetween. The boss 80 is provided with a lower tapered or inclined face 82 best shown in FIG. 6 and cooperating with the stop 50 on the card holder to limit the pivotal movement of the card holder in a manner which has been described above.

Considering next the latching means 29 and referring particularly to FIGS. 3, 5 and 7 of the drawings, it should be observed that this mechanism includes a solenoid 85 which is identical to the solenoid 60 previously described and which is mounted upon a U-shaped bracket 86 secured to the platform 35 in any suitable manner as, for example, by means of screws 86a (FIG. 3). The armature 87 of the solenoid is biased toward the left as viewed in FIG. 7 by means of a coil spring 88 having one end resting against the bracket 86 and having its other end seated against an annular collar 89 carried by the armature. The collar 89 seats against a downwardly depending boss 90 formed on the platform 35 for the purpose of limiting the leftward movement of the solenoid armature. As is best shown in FIG. 5, a pin 91 carried by the armature extends through an opening 90a in the boss 90 and protrudes into the path of pivotal movement of a latch finger 92 fixedly secured to the end of the shaft 41 extending outwardly beyond the boss 40. The latch finger 92 includes a hub portion 92a in the form of a C-shaped clamp, the ends of which may be drawn together by tightening a screw 93 in order to apply clamping pressure for holding the hub portion in fixed position upon the shaft 41. The free end of the latch finger 92 takes the form of a generally rectangularly shaped, flat portion 95 having an opening 96 therein for accommodating the pin 91 when the cover is in the closed position shown in FIGS. 10 and 11. The member 95 is also provided with an inclined or tapered edge portion 97 against which the pin 91 rides when the cover 28 is moved from its open position shown in FIG. 12 to the closed position. A spring 98 having a central portion wound around the shaft 41 in the space formed between the boss 40 and the latch finger 92 has its opposed ends in respective engagement with the latch finger 92 and with the frame 34 of the base 33 for the purpose of applying a biasing force normally tending to bias the latch finger to pivot in a counterclockwise direction as shown in FIG. 10 so that the cover 28 is normally biased toward its open position shown in FIG. 12. When the voter inserts his ballot card 25 and manually depresses the cover 28 to move the latter from the open position shown in FIG. 12 to the closed position shown in FIG. 10, the latching finger 92 is pivoted in a clockwise direction from the position shown in FIG. 12 and the coil spring 98 is compressed. As the latch finger 92 moves in the clockwise direction, the inclined edge 97 encounters the pin 91 to force the latter pin to the right as viewed in FIG. 7, thus compressing the spring 88 and moving the collar 89 away from the boss 90. When the latch finger 92 reaches the position where the opening 96 is aligned with the pin 91, the latter pin is forced into this opening by expansion of the spring 88 until the collar 89 is again seated against the boss 90 whereupon the cover 28 is latched in the closed position shown in FIG. 10 and cannot be raised to remove the voter identification card either by the voter or by the precinct officials.

The voter classification unit 22 further includes switch means 100 best shown in FIGS. 3, 4 and 7 of the drawings for preventing application of voltage to the pins 53 and 77 until the card cover 28 has been moved near its fully closed or latched position, thus preventing the voter from being electrically shocked by touching an energized pin during insertion of the card 25. More specifically, this switch means comprises pairs of normally open contacts 101 and 102 carried upon a conventional insulating support assembly 103 secured to the base 35. One contact of each set carries an operating member engaging a switch operating arm 104 formed integrally with the hub portion of the latching finger 92. The switch operating arm 104 extends outwardly from the hub and is shaped and dimensioned to hold the contacts 101 and 102 open until the cover 28 reaches a position within about five degrees from its fully closed position at which time the contacts 101 and 102 are both closed to apply voltage across all of the pairs of pins 53 and 77 making up the sensing means 24.

Considering now the operation of the voting machine 20 when used in conjunction with an automatic voter classification senser unit 22 and referring particularly to FIG. 13 of the drawings, it should be recognized that after the voter's card 25 has been inserted into the card holder 20 and after the cover 28 has been moved to the closed position, the pairs of sensing pins 53 and 77 forming the sensing means 24 will determine which of the holes of the ballot card have been prepunched. It should also be observed that the ballot card can only be inserted into the card holder in one position in view of the fact that its precut corner 25a will fit into the tray 43 in only one position. Certain of the columns of the card will be used for the classification of the voter, the number of such columns, of course, being determined by the number of different classes of voters taking part in the election. Other columns of the card will be used to punch in validating information in binary form and the number of columns so used will depend upon the code desired for validating the card. One additional column is used to control a trip circuit which makes certain that a card has been inserted into the card holder. The patch board made up of the terminals 59 and 80 may be electrically connected in the control circuit to permit any of the card columns to be used for performing any of the functions described above, but it will be assumed for purposes of description that the column at the extreme right of the card as viewed in FIG. 8 will be used for the trip circuit, that the next three columns proceeding toward the left will be used for the validation of the card and that the columns at the extreme left are to be used for voter classification. It will further be assumed that the card is valid only when the second and third columns from the right are punched while the fourth column is not punched. While there may be as many as five or more different classes of voters, to simplify the description, it will be assumed that only three different classes are to take part in the election and, to lend clarity to the description, it will be further assumed that the election is a primary election and that the three different classifications are Democrat, Republican and Independent.

As is described in detail in the copending application of Edward J. Crossland et al., Serial No. 120,281, referred to above, each of the columns of the voting machine 20 has associated therewith a counter actuator which is adapted to be moved to the counter actuating position only when a solenoid associated with that column is energized. The solenoids for the different columns are identified in FIG. 13 by the reference numerals 105-1, 105-2, 105-3 etc. Actually, the voting machine contains twelve columns but, for purposes of illustration, only six solenoids and the associated six columns are represented in FIG. 13. Each column of the voting machine also has associated therewith an indicating light, the light for the first column being identified in FIG. 13 by the reference numeral 106-1, the light for the second column being identified by the reference numeral 106-2, and so forth. The illumiantion of the idicating lights 106-1, 106-2, etc. is visible from the front panel of the voting machine since each of these lights is disposed behind a light cover located at the top of the associated column. For the purpose of permitting the election officials to program the machine prior to the election, there is associated with each column a multiple position, manually operated selector switch, the switch for the first column being indicated by the reference numeral 107-1, that associated with the second column being identified by the reference numeral 107-2, and so on. The switches are located within the housing for the voting machine and are not accessible to the voter or to the precinct officials during the course of the election. The switches are set by a custodian or other election official prior to the election and the housing is locked throughout the course of the election to prevent tampering with the switches. The switches 107-1, 107-2, etc. are adapted to be preset by the custodian to cooperate with the solenoid and with the sensing means 24 to render effective only those columns of the voting machine containing issues upon which the voter is qualified to vote as indicated by the prepunched classification information on his identification card 25. The illumination of the lights 106-1, 106-2, etc. indicates which columns are active and, hence, informs the voter as to those columns in which his selections should be made. To this end, each selector switch contains a number of switch positions corresponding to the number of different voter classifications. For purposes of illustration, a three position switch is shown in FIG. 13 so that the voting machine is capable of handling three different classifications of voters, for example, Democrat, Republican and Independent, in the primary election assumed above. Each of the selector switches contains a movable wiper arm, and a set of fixed contacts equal in number to the number of different voter classifications, for example, three fixed contacts in the illustration assumed above. The movable wiper arm of each switch is connected to a parallel circuit consisting of the associated solenoid and indicating light and the parallel circuit is, in turn, connected to the grounded side of an A.C. source applied between a pair of input terminals 108 and 109. As was previously indicated, the three columns at the left of the card 25 as viewed in FIG. 8 may be used for the voter classification and these three columns appear at the top of the card 25 as viewed in FIG. 13. Thus, if the voter is a Democrat, one of the columns, for example, the upper column will be punched, and the sensing pins 77-1 and 53-1 associated with this column will engage to complete an electrical circuit therebetween. Similarly, if the voter is an Independent, the second column of the card 25 will be punched and sensing pins 77-2 and 53-2 will engage. Finally, if the voter is a Republican, and in the example shown in FIG. 13, this is the case, the third column of the card will be punched as indicated at 26c and the sensing pins 77-3 and 53-3 will engage.

To understand the operation of the electrical circuit illustrated in FIG. 13, let it be assumed that it is desired to program the machine 20 for operation in a primary election so that all of the issues upon which the Democrat voter is eligible to vote are located in the first two columns, namely, in the columns associated with the solenoids 105-1 and 105-2, whereas all of the issues upon which the Independent voter is eligible are located in the columns associated with the solenoids 105-3 and 105-4, and all of the issues upon which the Republican voter is eligible are located in the columns associated with the solenoids 105-5 and 105-6. It should be understood, however that the switches 107-1, etc. and the prepunched holes on the card 25 may be coordinated to permit any desired column or columns to be used for any particular class of voter. In the example assumed, however, the switches 107-1 and 107-2 associated with the two Democrat columns are set to the first position as illustrated in FIG. 13 while the two switches 107-3 and 107-4 are set to the second position and the switches 107-5 and 107-6 are set to the third position. The first contact of all of the switches is connected via a conductor 110 to the sensing pin 77-1 while the second contact of all switches is connected to the pin 77-2 via a conductor 115 and the third contact of all switches is connected via a conductor 114 to the sensing pin 77-3. It will be recalled that the pin 77-1 cooperates with the pin 53-1 to determine whether the card 25 has been prepunched for a Democrat voter while the pin 77-2 and the pin 53-2 cooperate to determine whether the voter is an Independent and the pins 77-3 and 53-3 cooperate to determine whether the voter is a Republican. All of the pins 53-1, 53-2 and 53-3 associated with the voter classification sensing column of the card 25 are connected through a conductor 111 and through sets of the contacts 112-1 and 113-1 to one side 109 of the A.C. source. The contacts 112-1 are a normally open set of contacts controlled by a card validation relay 112 which is effective in a manner more fully described below to determine whether the ballot card is valid for the particular election being conducted. The contacts 113-1 are a normally closed set of contacts of a trip circuit relay 113 which has the function of determining whether a card has been placed between the card holder 27 and the cover 28. If the voter's identification card 25 were punched in the area between the pins 77-1 and 53-1 to indicate that the voter is a Democrat, a circuit would be completed to both of the solenoids 105-1 and 105-2 to energize both of the columns associated with these two solenoids. The other four columns would not be energized because their switches 107-3, 107-4, etc. are not in the first position and, hence, no power could be applied through the switches. In the example shown in the drawings, where the hole 26c in the voter identification card is disposed between the pins 77-3 and 53-3, a circuit is completed from the conductor 111 through the conductor 114 to the third contact of all of the switches 107-1, 107-2, etc. Thus, the solenoids 105-5 and 105-6 are energized but the solenoids associated with the other four columns are not energized. Similarly, if the card 25 had been punched in the area between the pins 77-2 and 53-2 a circuit would be completed from the conductor 111 and through the conductor 115 to the second contacts of all six of the switches 107-1, 107-2, etc. Thus, it will be observed that the voting machine may be easily programmed or set up by manipulation of the switches 107-1, 107-2, etc. to permit the voter to make selections only in those columns of the voting machine containing issues corresponding to his classification as indicated by the prepunched information on the voter card 25.

Turning now to the operation of the voting machine described above, it will be recognized that after the voter has placed his prepunched card in the card holder 27 and closed the cover 28, the switch 100 will be closed, thus closing both of the contact 101 and 102. The contacts 102 connect one side of the source 108 to the remaining components of the system, for example, to a common ground for the system, while the contacts 101 complete a circuit from the second terminal 109 of the source to the relays 112 and 113. The trip relay 113 is connected to one of the pins, for example, the pin 77-7 associated with the column of the card 25 which indicates whether a ballot card has been inserted into the classification unit 22. This particular column of the card is not punched and, hence, if a card is in position, the pin 77-7 cannot engage its associated pin 53-7 but if the cover 28 is closed without first inserting a card 25 or, if a card is inserted which is punched in the area between the pins 77-7 and 53-7, the relay 113 is energized via a circuit including a conductor 116, a jumper 117 on the patch board formed by the terminals 59 and 80 referred to above, a second jumper 118 and a conductor 119 connected to the grounded side of the A.C. source. When the relay 113 is energized to indicate that no card has been inserted or that an improper card has been placed in the classification unit, the voting operation cannot proceed. Thus, if the relay 113 is energized, its contacts 113-1 are opened to break the circuit to the conductors 110, 114 and 115 from the terminal 109 of the power source, thus preventing energization of any of the solenoids 105-1, 105-2, etc. associated with the columns of the voting machine. In addition, the opening of the contacts 113-1 prevents the energization of a scan drive reverse relay 120 which controls the drive to the scan motor for driving the scanning rail of the voting machine and, as a result, the rail cannot be moved until a proper card has been inserted into the machine. Moreover, if the relay 113 is energized, a second set of normally open contacts 113-2 of this relay are closed to complete a circuit from the terminal 109 through a normally open set of contacts 121-1 of a lower limit switch to the cover solenoid 85. Since the scanning rail is located at the bottom of the voting machine when the voter first inserts his card 25 and since the contacts 121-1 of the lower limit switch are closed when the scanning rail is at the bottom, if the relay 113 is energized, a circuit will be completed to the cover solenoid 85, thus energizing this solenoid and, hence, releasing the latch 29 by withdrawing the pin 91 from the aperture 96 in the latch finger 92. The spring 98 then returns the cover 28 to the open position and it is impossible for the cover to remain closed unless a card is inserted into the machine which has been punched in the column between the pins 77-7 and 53-7.

As was previously indicated, a second relay 112 is provided to determine whether the ballot card is valid and in the illustration being considered, this information is contained in the second, third and fourth columns from the bottom of the card 25 or, more specifically, in the three columns located between the pins 77-4 and 53-4, 77-5 and 53-5 and 77-6 and 53-6. The patch board containing the terminals 59 and 80 has been wired so that the ballot card is valid only if the second and third columns from the bottom are punched while the fourth column is blank although it should be understood that any other coding arrangement could be selected merely by changing the jumper wires on the patch board terminals. Thus, if a properly punched card 25 is inserted between the card holder 27 and the cover 28, a circuit is completed from the terminal 109 through the relay 112, through a conductor 122, through the pins 77-6 and 53-6, through a conductor 123, through a jumper 124 on the patch board, through a conductor 125, through the pins 77-5 and 53-5, through a conductor 126 and through the jumpers 118 and 119 to the second side of the A.C. source, thus energizing the relay 112. It will be apparent that the latter circuit cannot be completed unless the holes 26a and 26b are punched in both the second and third columns of the card 25. Moreover, if the fourth column between the pins 77-4 and 53-4 were punched, a circuit would be completed from the trip relay 113, through a jumper 127 and through conductors 128 and 129 to the ground wire 119, thus energizing the trip relay to prevent the operation from continuing.

When the relay 112 is energized, its contacts 112-1 are closed to connect the conductors 110, 114 and 115 to the terminal 109 for the purpose of energizing the solenoids 105-1, 105-2, etc. in the manner previously described. Obviously, if an invalid card has been inserted into the machine, the relay 112 cannot be energized and the solenoids will remain deenergized. At the same time, the relay 120 controlling the drive of the scanning rail cannot be energized and the operation cannot continue. Moreover, if the relay 112 is not energized a second set of normally closed contacts 112-2 of this relay will complete a circuit to the cover solenoid 85 in the manner previously described in order to release the cover so that the latter will return to its open position.

Assuming that a valid card has been inserted into the voter classification unit 22, the relay 113 will be deenergized while the relay 112 is energized and, as a result, the card cover solenoid 85 will remain deenergized and the card cover will be latched in the closed position. The terminal 109 will be connected through the relay contacts 113-1 and 112-1 to the conductors 110, 114 and 115 and the sensing pins 53-1, 77-2 and 53-2 and 77-3 and 53-3 will determine the classification of the voter from the prepunched information on the card to energize only the proper columns.

As soon as a valid card has been inserted into the machine, a circuit is completed from the terminal 109, through the contacts 113-1 and 112-1 to the scan rail reverse drive relay 120 through a normally closed upper limit switch 134. The relay 120 is thus energized to open its normally closed contacts 120-1 and 120-2 and to close its normally open contacts 120-3 and 120-4. A circuit is thus completed from the terminal 109 through the contacts 120-3, through an armature winding 132 of a series wound scan rail drive motor, through the closed contacts 120-4 and through the field winding 133 of the scan drive motor, thus driving the motor in a direction to raise the scanning rail from the bottom of the voting machine housing to the top. As will be evident from the description in the above-identified Hull et al. application, the raising of the scanning rail results in restoration of all of the keys or selectors to their neutral positions and, at the same time, raises a curtain covering the front panel 23 of the voting machine. When the scan rail reaches the top of the voting machine at the completion of its key restoring sweep, the limit switch 134 is opened to break the circuit to the relay 120 with the result that the latter relay is deenergized and the drive to the scan motor is interrupted. The scan rail thus remains at the top of the voting machine while the voter manipulates the sliding keys or selectors to make his choices upon the different issues for which he is eligible.

As soon as the voter is satisfied with his choices, he depresses the manually operated "Vote" switch 31, thus completing a circuit to the drop solenoid 60 which functions in the manner described in detail above to release the latch 30 by withdrawing the pin 63 from the aperture 51a in the card holder whereupon the card holder is pivoted from its card receiving position to the card dropping position shown in broken lines in FIG. 11 to allow the card to fall into the housing 32 of the voter classification unit. Pivoting of the card holder 27 away from the cover 28 breaks the circuits between all of the pairs of sensing pins 53 and 77 and thus causes the relay 112 to be deenergized thus closing the contacts 112-2 and opening the contacts 112-1. The solenoid 85 is not energized, however, since the normally open contacts 121-1 are open with the scan rail raised. The opening of contacts 112-1 breaks the circuits to all of the solenoids 105-1, 105-2, etc. but by this time the counter actuators have been properly set. The opening of contacts 112-1 also prevents further energization of the relay 120 until a new card has been inserted by the next voter. Pivoting of the card holder to the card dropping position has no effect upon the trip circuit and the relay 113 remains deenergized. Closing of the vote switch 31 also results in energization of a scan drive forward relay 130 which has two sets of contacts 130-1 and 130-2. The contacts 130-1 complete a holding circuit for the relay 130 through a normally closed set of contacts 121-2 of the lower limit switch to ground. Since, as was indicated above, the scanning rail is at the top of the voting machine when the "Vote" switch 31 is first depressed, the normally closed limit switch contacts 121-2 will be in the closed position so that a circuit will be completed through the relay 130 to lock this relay across the terminals 108 and 109 as long as the contacts 121-2 remain closed. A second set of contacts 130-2 of the scan rail forward relay 130 completes a circuit from the terminal 109 through a set of normally closed contacts 120-1 of the scan rail reverse drive relay 120, through the armature winding 132 of the series wound scan rail drive motor, through the normally closed contacts 120-2 of the relay 120 and through the field winding 133 of the scan rail drive motor. Since the phase of the current through the armature winding 132 with respect to that through the field winding 133 is opposite to that which occurred when the relay 120 was energized, the scan motor is driven in a direction to lower the scan rail along the rear of the front panel of the voting machine from the top of the machine to the bottom thus actuating the counters of the voting machine in the manner described in the above-identified Hull et al. application. When the scanning rail completes its vote sensing sweep, the contacts 121-1 and 121-2 of the lower limit switch are actuated. The contacts 121-1 complete a circuit to the cover solenoid 85, through the contacts 112-2 which, as was indicated above, reverted to their normally closed position when the card 25 was dropped from the holder 27. Energization of the cover solenoid 85, of course, withdraws the pin 91 from the aperture 96 and permits the spring 98 to return both the cover 28 and the card holder 27 as a unit to the position shown in FIG. 12 where the cover is open and the card holder is in its card receiving position for receiving the card from the next succeeding voter. When the scan rail returns to the bottom of the voting machine, the contacts 121-2 are opened to break the holding circuit to the relay 130, thus deenergizing the latter relay to open the contacts 130-1 and 130-2. The openings of the contacts 130-1 prevents reenergization of the relay 130 until the scan rail reaches the top of the voting machine while the opening of the contacts 130-2 prevents further drive of the scan motor in the vote sensing direction and, hence, the scanning rail remains at the bottom of the machine until insertion of an identification card by the next succeeding voter.

In the event that the election officials do not want to use prepunched ballot cards either because of their expense or for other reasons, the voting machine 20 may be set up for the voter's classification by means of a remote manually operated voter classification unit indicated generally by the reference numeral 135 in FIG. 2. The latter unit is electrically connected to the voting machine 20 by means of a cable 136 which may be identical to the cable 21 but which could differ from the latter cable by the inclusion of a lesser number of conductors. The manually operated unit 135 includes a manually operated switch 137 movable to different positions representing the different classifications of voters. Thus, in the form of the invention shown in FIG. 2, five different voter classifications are represented and the switch 137 may be moved to any one of these five positions. The electrical circuit is wired so that the switch 137 in each position is effective to complete a circuit only to those solenoids associated with columns containing issues upon which the voter is eligible to exercise a choice. Since the electrical connections necessary to effect this result are believed to be obvious in view of the foregoing description, the details are herein omitted. The switch 137 is set by the precinct official for each voter using the machine and, as in the case of the automatic unit previously described, the voting machine 20 has been set prior to the election by operation of the selector switches 107-1, 107-2, etc. so that the columns energized correspond exactly with the voter's classification as manually set up on the unit 135. The form of the invention illustrated in FIG. 2 retains the advantage of having the classification unit remote from the voting machine so that it is not accessible to the voter and, hence, cannot be manipulated or tampered with during the voting process.

While particular embodiments of the invention have been illustrated and described, it will be recognized that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In a voting machine, a main housing including a panel containing different selectors for permitting the voter to make a selection, means for registering the selections made by the voter, electrically operated means in said main housing for rendering different groups of selectors effective to actuate the registering means with the different groups respectively corresponding with different classifications of voters, and auxiliary housing remote from said main housing, and electrical conductor means connecting said main housing and said auxiliary housing, said auxiliary housing carrying selector means operated in accordance with each voter's classification and electrically connected via said conductor means to said electrically operated means, said selector means causing said electrically operated means to render effective only the group of selectors corresponding to the classification of the particular voter using the voting machine.

2. Apparatus according to claim 1 wherein the selector means includes a manually operated switch settable to different positions respectively corresponding to the different voter classifications.

3. Apparatus according to claim 1 wherein the selector means includes a sensing mechanism for automatically sensing information contained on identification means individually supplied to each voter, said information including the classification of the voter.

4. In a voting machine, a housing including a panel containing different selectors for permitting the voter to make a selection, means for registering the selections made by the voter, electrically operated means in said housing for rendering different groups of selectors effective to actuate the registering means with the different groups respectively corresponding with different classifications of voters, selector means remote from said housing operated in accordance with each voter's classification, and electrical conductor means connecting said housing and said selector means, said selector means causing said electrically operated means to render effective only the group of selectors corresponding to the classification of the particular voter using the voting machine.

5. Apparatus according to claim 4 wherein the selector means includes a manually operated switch settable to different positions respectively corresponding to the different voter classifications.

6. Apparatus according to claim 4 wherein the selector means includes a sensing mechanism for automatically sensing information contained on identification means individually supplied to each voter, said information including the classification of the voter.

7. In a voting machine, a housing including a panel containing different selectors for permitting the voter to make a selection, electrically operated means in said housing for rendering different groups of selectors effective with the different groups respectively corresponding with different classifications of voters, selector means remote from said housing operated in accordance with each voter's classification, and electrical conductor means electrically connecting said electrically operated means and said selector means, said selector means causing said electrically operated means to render effective only the group of selectors corresponding to the classification of the particular voter using the voting machine.

8. Apparatus according to claim 7 wherein the selector means includes a manually operated switch settable to different positions respectively corresponding to the different voter classifications.

9. Apparatus according to claim 7 wherein the selector means includes a sensing mechanism for automatically sensing information contained on identification means individually supplied to each voter, said information including the classification of the voter.

10. In a voting machine, a main housing including a panel containing different selectors for permitting the voter to make a selection, electrically operated means in said main housing for rendering different groups of selectors effective with the different groups respectively corresponding with different classifications of voters, an auxiliary housing remote from said main housing, and electrical conductor means connecting said main housing and said auxiliary housing, said auxiliary housing carrying selector means operated in accordance with each voter's classification and electrically connected via said conductor means to said electrically operated means, said selector means causing said electrically operated means to render effective only the group of selectors corresponding to the classification of the particular voter using the voting machine.

11. Apparatus according to claim 10 wherein the selector means includes a manually operated switch settable to different positions respectively corresponding to the different voter classifications.

12. Apparatus according to claim 10 wherein the selector means includes a sensing mechanism for automatically sensing information contained on identification means individually supplied to each voter, said information including the classification of the voter.

13. In a voting machine of the type utilizing a voter identification card having pre-recorded information thereon concerning the classification of the voter, said voting machine having a plurality of groups of selectors for operation by the voter to make his choices with the different groups respectively corresponding with different classifications of voters, and means for sensing the information on each card and for rendering effective only that group of selectors corresponding with the classification of the voter whose card is being sensed, the improvement which comprises a housing for said sensing means containing a card holder pivotally mounted thereon for movement from an original card receiving position to a card dropping position and a cover mounted for pivotal movement relative to the card holder and manually movable by the voter from an open position wherein the card may be inserted into the card holder to a closed position wherein the card is held between the holder and the cover, latching means for holding the cover in closed position to prevent removal of the card while the voter operates his group of selectors, means for pivoting the holder away from the cover to its card dropping position to drop the card from the holder into the housing after the voter has made his selections, and means operable after the vote has been cast for pivoting said card holder and said cover as a unit back to their original positions wherein the cover is in open position and the holder is in its card receiving position.

14. In a voting machine of the type utilizing a voter identification card having pre-recorded information thereon concerning the classification of the voter, said voting machine having a plurality of groups of selectors for operation by the voter to make his choices with the different groups respectively corresponding with different classifications of voters, means for sensing the information on each card and for rendering effective only that group of selectors corresponding with the classification of the voter whose card is being sensed, means for registering the selections made by the voter and including a scanning mechanism movable past said selectors, and manually operated means for rendering said scanning mechanism effective to begin its movement only after the voter has made his choices by operating his group of selectors, the improvement which comprises a housing for said sensing means containing a card holder pivotally mounted thereon for movement from an original card receiving position to a card dropping position and a cover mounted for pivotal movement relative to the card holder and manually movable by the voter from an open position wherein the card may be inserted into the card holder to a closed position wherein the card is held between the holder and the cover, latching means for holding the cover in closed position to prevent removal of the card while the voter operates his group of selectors, means effective automatically when the manually operated means is operated for pivoting the holder away from the cover to its card dropping position to drop the card from the holder into the housing, and means operable after the scanning mechanism has completed its scan for pivoting said card holder and said cover as a unit back to their original positions wherein the cover is in its open position and the holder is in its card receiving position.

15. In a voting machine of the type utilizing a voter identification card having pre-recorded information thereon concerning the classification of the voter, said voting machine having a plurality of groups of selectors for operation by the voter to make his choices with the different groups respectively corresponding with different classifications of voters, and means for sensing the information on each card and for rendering effective only that group of selectors corresponding with the classification of the voter whose card is being sensed, the improvement which comprises a housing for said sensing means containing a card holder pivotally mounted thereon for movement from an original card receiving position to a card dropping position and a cover mounted for pivotal movement relative to the card holder and manually movable by the voter from an open position wherein the card may be inserted into the card holder to a closed position wherein the card is held between the holder and the cover, latching means for holding the cover in closed position to prevent removal of the card while the voter operates his group of selectors, and means for pivoting the holder away from the cover to its card dropping position to drop the card from the holder into the housing after the voter has made his selections.

16. In a voting machine of the type utilizing a voter identification card having pre-recorded information thereon concerning the classification of the voter, said voting machine having a plurality of groups of selectors for operation by the voter to make his choices with the different groups respectively corresponding with different classifications of voters, means for sensing the information on each card and for rendering effective only that group of selectors corresponding with the classification of the voter whose card is being sensed, means for registering the selections made by the voter and including a scanning mechanism movable past said selectors, and manually operated means for rendering said scanning mechanism effective to begin its movement only after the voter has made his choices by operating his group of selectors, the improvement which comprises a housing for said sensing means containing a card holder pivotally mounted thereon for movement from an original card receiving position to a card dropping position and a cover mounted for pivotal movement relative to the card holder and manually movable by the voter from an open position wherein the card may be inserted into the card holder to a closed position wherein the card is held between the holder and the cover, latching means for holding the cover in closed position to prevent removal of the card while the voter operates his group of selectors, and means effective automatically when the manually operated means is operated for pivoting the holder away from the cover to its card dropping position to drop the card from the holder into the housing.

17. In a voting machine of the type utilizing a voter identification card having pre-recorded information thereon concerning the classification of the voter, said voting machine having a plurality of groups of selectors for operation by the voter to make his choices with the different groups respectively corresponding with different classifications of voters, means for sensing the information on each card and for rendering effective only that group of selectors corresponding with the classification of the voter whose card is being sensed, the improvement which comprises a housing for said sensing means containing a card holder pivotally mounted thereon for movement from an original card receiving position to a card dropping position and a cover mounted for pivotal movement relative to the card holder and manually movable by the voter from an open position wherein the card may be inserted into the card holder to a closed position wherein the card is held between the holder and the cover, and means for pivoting the holder away from the cover to its card dropping position to drop the card from the holder into the housing after the voter has made his selections.

18. In a voting machine of the type utilizing a voter identification card having pre-recorded information thereon concerning the classification of the voter, said voting machine having a plurality of groups of selectors for operation by the voter to make his choices with the different groups respectively corresponding with different classifications of voters, means for sensing the information on each card and for rendering effective only that group of selectors corresponding with the classification of the voter whose card is being sensed, means for registering the selections made by the voter and including a scanning mechanism movable past said selectors, and manually operated means for rendering said scanning mechanism effective to begin its movement only after the voter has made his choices by operating his group of selectors, the improvement which comprises a housing for said sensing means containing a card holder pivotally mounted thereon for movement from an original card receiving position to a card dropping position and a cover mounted for pivotal movement relative to the card holder and manually movable by the voter from an open position wherein the card may be inserted into the card holder to a closed position wherein the card is held between the holder and the cover, and means effective automatically when the manually operated means is operated for pivoting the holder away from the cover to its card dropping position to drop the card from the holder into the housing.

References Cited in the file of this patent
UNITED STATES PATENTS

| | | |
|---|---|---|
| 2,054,102 | Shoup et al. | Sept. 15, 1936 |
| 2,054,103 | Shoup et al. | Sept. 15, 1936 |